(12) United States Patent
Bunton et al.

(10) Patent No.: US 6,738,344 B1
(45) Date of Patent: May 18, 2004

(54) LINK EXTENDERS WITH LINK ALIVE PROPAGATION

(75) Inventors: William P. Bunton, Pflugerville, TX (US); William J. Watson, Austin, TX (US); David A. Brown, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 730 days.

(21) Appl. No.: 09/671,940

(22) Filed: Sep. 27, 2000

(51) Int. Cl.[7] ................ H04J 3/14; H04L 5/14
(52) U.S. Cl. ............... 370/216; 370/228; 370/242
(58) Field of Search ............... 370/216–218, 370/221, 227, 228, 241, 242, 244, 245, 250, 251, 254; 714/1, 2, 3, 4

(56) References Cited

U.S. PATENT DOCUMENTS

| | | | |
|---|---|---|---|
| 4,131,767 A | * 12/1978 | Weinstein | 379/406.06 |
| 5,208,810 A | 5/1993 | Park | 370/94.1 |
| 5,268,900 A | 12/1993 | Hluchyj et al. | 370/94.1 |
| 5,557,751 A | 9/1996 | Banman et al. | 395/250 |
| 5,574,849 A | 11/1996 | Sonnier et al. | 395/182.1 |
| 5,675,579 A | 10/1997 | Watson et al. | 370/248 |
| 5,694,121 A | 12/1997 | Karuse et al. | 340/825.5 |
| 5,710,549 A | 1/1998 | Horst et al. | 340/825.5 |
| 5,867,501 A | 2/1999 | Horst et al. | 370/474 |
| 6,304,546 B1 | * 10/2001 | Natarajan et al. | 370/216 |
| 6,337,846 B1 | * 1/2002 | Bengston et al. | 370/216 |
| 6,504,630 B1 | * 1/2003 | Czarnocha et al. | 398/15 |

* cited by examiner

*Primary Examiner*—Ajit Patel

(57) ABSTRACT

A link extender is used for extending links between end nodes or router nodes in a system area network. Nodes in the network transmit link alive symbols to indicate that a link is alive. The link extender includes a link alive propagation feature for propagating the loss of link alive between ports of the link extender.

7 Claims, 3 Drawing Sheets

LINK EXTENDERS WITH LINK ALIVE PROPAGATION

BACKGROUND OF THE INVENTION

A SAN is used to interconnect nodes within a distributed computer system, such as a cluster. The SAN is a type of network that provides high bandwidth, low latency communication with a very low error rate. SANs often utilize fault-tolerant technology to assure high availability. The performance of a SAN resembles a memory subsystem more than a traditional local area network (LAN).

The preferred embodiments will be described implemented in the ServerNet (ServerNet) architecture, manufactured by the assignee of the present invention, which is a layered transport protocol for a System Area Network (SAN). The ServerNet II protocol layers for an end node and for a routing node are illustrated in FIG. 1. A single NIC and VI session layer may support one or two ports, each with its associated transaction, packet, link-level, MAC (media access) and physical layer. Similarly, routing nodes with a common routing layer may support multiple ports, each with its associated link-level, MAC and physical layer. The link layer protocol provides link management functions, encoding and decoding of data and command, and buffering of received packet data. The ServerNet II link layer protocol is a set of simple protocols, running concurrently to manage the flow of status and packet data between ports on independent nodes. Each port contains a transmitter (TxPort) and a receiver (RxPort) which cooperate to manage the link.

Support for two ports enables ServerNet SAN to be configured in both non-redundant and redundant (fault tolerant, or FT) SAN configurations. On a fault tolerant network, a port of each end node may be connected to each network to provide continued message communication in the event of failure of one of the SANs. In the fault tolerant SAN, nodes may be also ported into a single fabric or single ported end nodes may be grouped into pairs to provide duplex FT controllers. The fabric is the collection of routers, switches, connectors, and cables that connects the nodes in a network.

The SAN includes end nodes and routing nodes connected by physical links. Each node may be an end node which generate and consume data packets. Routing nodes never generate or consume data packets but simply pass the packets along from the source end node to the destination end node.

Each node includes duplex ports connected to the physical link. A link layer protocol (LLP) manages the flow of status and packet data between ports on independent nodes.

The ServerNet SAN has the ability to perform system management from a single point anywhere in the SAN. SAN management performs many functions including collection of error information to isolate faults to the link or module where the faults occurred.

An "In Band Control" or IBC mechanism supports a low overhead way of performing SAN management functions. The term "in band" indicates that the network management control data travels over the existing SAN links—with no separate cable or LAN connection. In contrast to data packets, both routing nodes and end nodes generate and consume IBC packets. IBC packets are not routed like data packets, each IBC packet contains embedded source routing information. Each router or end node that receives the IBC packet forwards to the next destination in source route list.

The ServerNet SAN includes a maintenance system having responsibility for system initialization, fault reporting, diagnostics, and environmental control. A pair of service processors (SPs) manage the maintenance system. The SPs functions as ServerNet I/O controllers and communicate with each other only via the ServerNet SAN.

The maintenance system uses dual system-maintenance buses which form redundant trees, independent of normal system functional paths and provide a path of two industry standard interconnects. The maintenance system controls, initializes, tests, and monitors all ASIC operations and provides a means for ASIC initialization, SAN topology determination, and error reporting.

In the SeverNet SAN either data or command symbols are continually being transmitted on a link. IDLE commands are transmitted when there are no packets or other commands to be sent. FILL commands are inserted into a stream of packet data when the flow control protocol indicates that the receive port cannot accept additional packet data.

The LLP manages a BUSY/READY flow control protocol used to communicate all changes in the state of a port's receiver to the remote node. When the ports receiver state changes to "inbound busy", i.e., the port can not accept more data packets, its transmitter sends a BUSY command. When the receiver state changes to "inbound ready" its transmitter sends a READY command.

The LLP also manages a link alive protocol which uses the flow control commands (BUSY/READY) to implement a heartbeat which is monitored by the remote receiver on the link. Periodically, the link-alive protocol triggers transmission of a flow control command that indicates the current state of the local receiver.

The flow control protocol requires that ports transmit a flow control command whenever the state of its receiver changes. The link alive protocol requires that ports repeat the last flow control transmitted when no local receiver state change has occurred for approximately 512 symbol times.

The receiver ports on one end of the link must monitor the applicable link alive commands from the remote port to determine the state of the link. A link is considered "alive" when it is receiving link alive commands regularly. A link is considered "dead" when a receiver detects no link alive commands within a predetermined time period. The link exception protocol is notified when link state changes from "alive" to "dead". Receive ports provide a "link alive" status bit indicating whether the link is obeying an applicable link alive protocol. Transitions of the "link alive" status bit must be capable of causing an interrupt (either directly at an end node or via the maintenance interface at routing nodes).

The ServerNet SAN has been enhanced to improve performance. The original ServerNet SAN configuration is designated SNet I and the improved configuration is designated SNet II. Among the improvements implemented in the SNet II SAN is a higher transfer rate and different symbol encoding. To attach SNet I end nodes and routing nodes to serial cables a special two-port router ASIC that matches SNet I devices to SNet II devices. This two-port router will be referred to as a "link extender" in this document. The link extender includes a local port coupled to a shorter link and a remote port coupled to a longer link. The remote port includes a big FIFO to compensate for the latency of the longer link. The term "link extender" is used herein only a convenient name and does not connote any limitations on the functioning of the device.

The link extenders normally operate without the intervention of system error handling software. The system error handling software treats a connection including link extenders as if it were a single link.

A typical connection utilizing link-extenders is depicted in FIG. 2. End node A is connected to first link extender x by link1. The first link extender x is coupled by link 2 to a second link extender y. The second link extender y is coupled by link 3 to the End Node B. The link extenders normally operate without intervention of system error handling software.

Link alive status information is not propagated between ports. Thus, loss of link alive on link 1 would not be propagated to end node B so that no interrupt would be generated.

SUMMARY OF THE INVENTION

According to one aspect of the invention, a link extender includes link alive propagation logic for propagating the loss and resumption of link alive between the ports of the link extender.

According to another aspect of the invention, the link alive propagation logic monitors a status bit maintained at each port which is set to indicate that a link is alive and reset to indicate that a link is dead. If the status bit in one port is reset the link alive logic asserts a blocking signal to block transmission of link alive commands at the other port.

According to another aspect of the invention, a connection includes a first node, first and second link extenders, a second node, a first link coupling the first node and the first link extender, a second link coupling the link extenders, and a third link coupling the second link extender to the second node. If the first link becomes dead, the second link extender stops transmitting link alive commands on the second link and the second link extender stops transmitting link alive commands on the third link. Thus, link alive status is propagated through the link extenders of the connection and the second node is alerted that the first link is dead.

Other features and advantages will be apparent in view of the following detailed description and appended drawings.

DESCRIPTION OF THE SPECIFIC EMBODIMENTS

Figure 3:
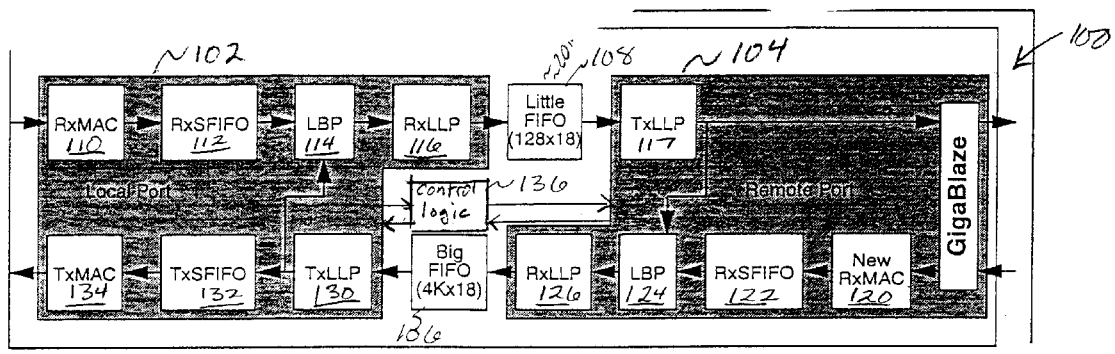
FIG. 3 is a block diagram of a link extension chip.

FIG. 3 is a block diagram of a link extension chip 100 which includes a local port 102 and a remote port 104 each including a transmit/receive pair. Big and little FIFOs 106 and 108 coupled the local and remote ports. The local port is associated with a short link that pushes data into the little FIFO 106 and the remote port 104 is associated the longer link, e.g., a long cable or fiber optic link, and pushes data into the big FIFO 108.

The receive side of the local port 102 includes a receive media access layer (RxMAC) 110, a receive synchronization module (RxSFIFO) 112, a loop back prevention module (LBP) 114, and a receive link layer protocol module (RxLLP) 116. The transmit side of the remote port 102 includes the transmit link level protocol module (TxLLP) 117 and is coupled to the receive side of the local port 102 by the little FIFO 106.

The receive side of the remote port includes a receive media access layer (RxMAC) 120, a receive synchronization module (RxSFIFO) 122, a loop back prevention module (LBP) 124, and a receive link layer protocol module (RxLLP) 126. The transmit side of the remote port 104 includes a transmit link layer protocol module (TXLLP) 130, a transmit synchronization module (TxSFIFO) 132, and a transmit media access layer module (TxMAC) 134. The transmit side of the local port 102 is coupled to the receive side of the remote port by the big FIFO 108. A big FIFO 108 is required because of the large latency of long serial links.

A control logic module 136 implements the following control functions:
1. link exception clean up
2. loss of link alive forwarding
3. IBC forwarding In a currently preferred embodiment a GigaBlaze control register contains the necessary control and status to operate the LSI Logic GigaBlaze™ G10™ which implements parallel/serial conversion.

As described above, one function of the link level protocol (LLP) is to manage the link alive protocol.

Figure 1:
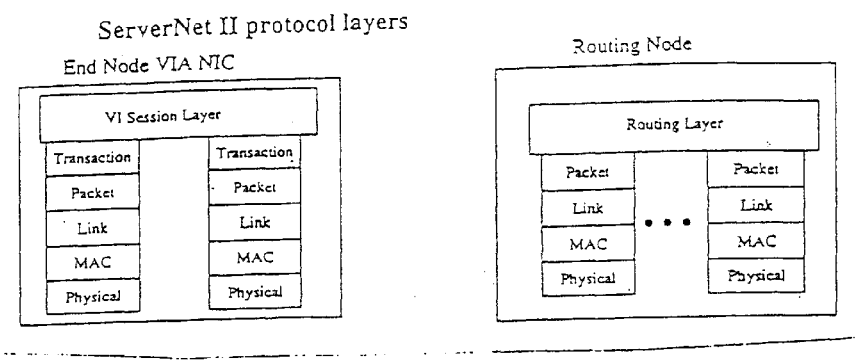
FIG. 1 is a block diagram depicting the protocol layers for SAN nodes.
Figure 2:
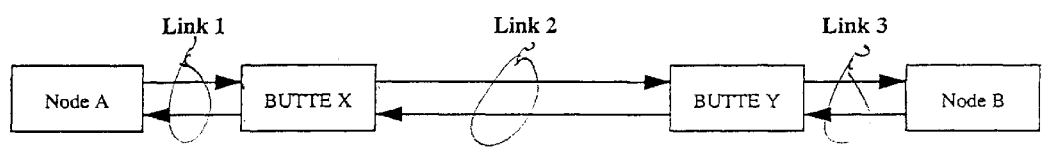
FIG. 2 depicts end nodes and link extension chips coupled in a connection.

In FIG. 2, according to the standard link alive protocol, if the transmitter of end node A stopped transmitting link alive commands then the local port of the first link extender would set its "link alive" status bit to indicate that the link I was dead. This information is not propagated to the remote port of the first link extender so that link alive commands would continue to be transmitted on link 2 and link 3. Therefore, end node B would not detect the loss of link alive on link 1 and cause an interrupt. Further, because link extender nodes generally operate without the intervention of error correcting software, the setting of the "link alive" status bit at the local port of the first link extender would not cause an interrupt.

In a preferred embodiment of the invention, the control logic in a link extender tracks link alive status on both ports. The control logic module monitors the state of a receiver link. When there is a loss of link alive status on one port the control logic blocks the transmission of keep alive command symbols on the other port.

Figure 4:
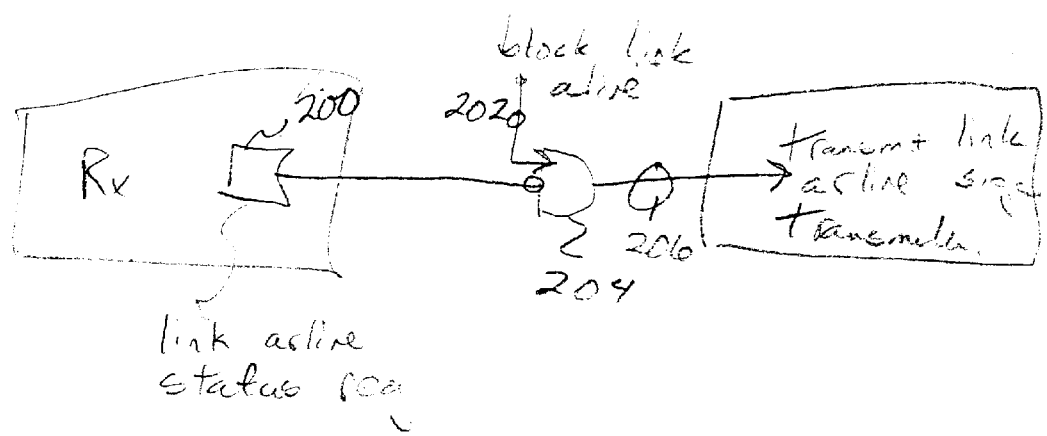
FIG. 4 is a logic diagram of part of a control logic module.

FIG. 4 depicts logic for monitoring link alive status at a port of the link extender and blocking transmission of link alive from the other port. In FIG. 4, a flag register includes a "link alive" status flag 200 which is set when the connected link is alive and reset when the connected link is dead. The control logic generates a first signal 202 which is logically ANDed with the negated "link alive" status flag 200 by a logic element 204. When the status flag is reset a blocking signal 206 is asserted by the logic element 204. This blocking signal blocks the transmission of link alive signals at the other port. When the status flag is set the blocking signal 206 is negated and link alive signal transmission is resumed at the other port.

For example, referring to FIG. 2, if an event at node A terminates the transmission of link alive symbols from its transmitter the control logic of the first link extender would detect the loss of link alive symbols. The control logic of the first link extender would then block the transmission of link alive symbols from the transmitter of the remote port. The second link extender would detect loss of link alive at its remote port and block the transmission of link alive from its local port. Node B would then detect the loss of link alive and report the loss of the link (connection).

The invention has now been described with reference to the preferred embodiments. Alternatives and substitutions will now be apparent to persons of skill in the art. In particular, the exceptions described above are by way example and not critical to practicing the invention. Accordingly, it is not intended to limit the invention except as provided by the appended claims.

What is claimed is:

1. In a system area network including end nodes and routing nodes connected by physical links and link extenders for coupling links from either end nodes or routing nodes to serial cables, where the link extenders are coupled in a connection comprising a first node having a port, a first link extender having local and remote ports, a first link coupling the port of said first node and the local port of said first link extender, a second link extender having local and remote ports, a second link coupling the remote ports of said first and second link extenders, a second node having a port, and a third link coupling the local port of said second link extender to the port of said second node, with the links being duplex links and each port having a receiver and transmitter, and with ports of nodes in the system area network transmitting link alive symbols to indicate to remote ports on a link that the link is alive, a method for propagating link alive symbols through a link extender comprising the steps of:

detecting, at a first link extender, an absence of link alive command transmissions on a first link coupled to a first port of the first link extender;

blocking the transmission of link alive symbols on a second link coupled to the second port of said first link extender;

monitoring said first port to detect the resumption of link alive commands transmitted on said first link;

if transmission on said first link is resumed, unblocking the transmission of link alive symbols on the second link coupled to the second port of said first link extender so that loss and resumption of link alive command transmissions is propagated through the link extender.

2. The method of claim 1 further comprising the steps of:

resetting a status flag when the first link extender detects the absence of link alive command transmission on said first link; and setting said status flag when the first link extender detects resumption of link alive command transmission on said first link.

3. The method of claim 2 wherein said step of blocking further comprises the steps of:

monitoring said status flag and blocking link alive command transmission only when said status flag is reset.

4. A system area network comprising:

a first node having a first node port, with the first node port including a link level protocol module for transmitting link alive commands to indicate a link is alive and for terminating the transmission of link alive command signals to indicate a link is dead;

first, second, and third links;

a first link extender, having local and remote ports coupled, respectively, to the first and second links, where the first link couples the local port and first node port, with the first link extender having its local and remote ports including link alive detection logic for detecting whether a link is alive or dead and a link level protocol module for transmitting link alive commands to indicate that a link is alive and for terminating the transmission of link alive command signals to indicate that a link is dead, and with the first link extender including control logic coupled to the link alive detection logic and the link level protocol modules of the local and remote ports, the control logic for blocking transmission of link alive commands from the remote port only when the local port detects that the first link is dead and for blocking transmission of link alive commands from the local port only when the remote port detects that the second link is dead;

a second node having a second node port, with the second node port including a link level protocol module for transmitting link alive commands to indicate a link is alive and for terminating the transmission of link alive command signals to indicate a link is dead; and a second link extender, having remote and local ports coupled, respectively, to the second link and third links, where the third link couples the local port and second node port, with the second link extender having its local and remote ports including link alive detection logic for detecting whether a link is alive or dead and a link level protocol module for transmitting link alive commands to indicate that a link is alive and for terminating the transmission of link alive command signals to indicate that a link is dead, and with the second link extender including control logic coupled to the link alive detection logic and the link level protocol modules of the local and remote ports, the control logic for blocking transmission of link alive commands from the remote port only when the local port detects that the third link is dead and for blocking transmission of link alive commands from the local port only when the remote port detects that the second link is dead.

5. In a system area network including end nodes and routing nodes connected by physical links, a link extender for coupling links from either end nodes or routing nodes to serial cables, with said link extender comprising:

a remote port including a link level protocol module for transmitting link alive commands to indicate a link is alive and for terminating the transmission of link alive command signals to indicate a link is dead and link alive detection logic for detecting whether a connected link is alive or dead;

a local port including a link level protocol module for transmitting link alive commands to indicate a link is alive and for terminating the transmission of link alive command signals to indicate a link is dead and link alive detection logic for detecting whether a connected link is alive or dead;

control logic, coupled to the link alive detection logic and the link level protocol logic of the local and remote ports, for blocking transmission of link alive commands from the remote port when the local port detects that the connected link is dead and for blocking transmission of link alive commands from the local port when the remote port detects that the connected link is dead.

6. The invention of claim 5 wherein said link alive detection logic includes a status bit which is set when the link is alive and reset when the link is dead.

7. The invention of claim 6 wherein said control includes a blocking signal circuit, coupled to said status bit, that asserts a blocking signal only when the status flag is reset.

* * * * *